US007835261B2

(12) United States Patent
Alliot et al.

(10) Patent No.: US 7,835,261 B2
(45) Date of Patent: Nov. 16, 2010

(54) UNIVERSAL DEROTATOR FOR UMTS MODES

(75) Inventors: Eric Alliot, Mougins (FR); Rodolfo Verzegnassi, Nice (FR)

(73) Assignee: NXP B.V., Eindhoven (NL)

( * ) Notice: Subject to any disclaimer, the term of this patent is extended or adjusted under 35 U.S.C. 154(b) by 1182 days.

(21) Appl. No.: 10/584,043

(22) PCT Filed: Dec. 14, 2004

(86) PCT No.: PCT/IB2004/004140

§ 371 (c)(1),
(2), (4) Date: Jun. 21, 2006

(87) PCT Pub. No.: WO2005/064873

PCT Pub. Date: Jul. 14, 2005

(65) Prior Publication Data

US 2007/0104251 A1 May 10, 2007

(30) Foreign Application Priority Data

Dec. 22, 2003 (EP) .................................. 03300282

(51) Int. Cl.
*G06K 9/36* (2006.01)
*H04B 1/00* (2006.01)
*H04B 17/00* (2006.01)
(52) U.S. Cl. ........................ 370/204; 382/232; 375/147; 455/67.11
(58) Field of Classification Search ................. 382/232, 382/233, 305, 100; 375/326, 347, 340, E1.002, 375/332, 343, 141, 341, 342, 147, 324, 327, 375/344, 323, 298, 260, 148, 150, 152, 271, 375/316; 370/335, 208, 342, 491, 441, 204, 370/215, 320, 345; 455/101, 502, 69, 522, 455/562.1, 255, 135, 67, 11, 442, 67.11
See application file for complete search history.

(56) References Cited

U.S. PATENT DOCUMENTS

| 6,804,311 | B1 * | 10/2004 | Dabak et al. ................. 375/347 |
| 6,934,245 | B2 * | 8/2005 | Kwak et al. ................. 370/204 |
| 7,139,324 | B1 * | 11/2006 | Ylitalo et al. ............... 375/267 |
| 7,149,258 | B2 * | 12/2006 | Nilsson et al. ............. 375/316 |
| 7,263,082 | B1 * | 8/2007 | Lindskog ..................... 370/335 |
| 7,286,593 | B1 * | 10/2007 | Banerjee ..................... 375/148 |
| 7,340,268 | B2 * | 3/2008 | Oh et al. ..................... 455/522 |

(Continued)

FOREIGN PATENT DOCUMENTS

WO    WO 01/06695    1/2001

*Primary Examiner*—Sheela C Chawan (57) ABSTRACT

The invention relates to a mobile communication apparatus (200) comprising a receiver (203), a derotator (206), a demodulator (208) and a processor (212). The receiver (203) is connected to the derotator (206), the derotator (206) to the demodulator (208), and the controller (212) to the receiver (203), derotator (206) and demodulator (208). The derotator (206) comprises means for processing Primary Common Control Physical Channel during Space Time coding based Transmit Diversity transmission mode, pilot symbols, symbols during closed loop transmission modes, and means for outputting symbols to the demodulator in a temporal ordered sequence. The means are connected in series for enabling a universal derotator. A method for derotation is provided, comprising the steps of processing P-CCPCH during STTD transmission mode (1002), processing pilot symbols (1004), processing symbols during closed loop transmission modes (1006), and outputting symbols in a temporal ordered sequence (1008).

20 Claims, 11 Drawing Sheets

U.S. PATENT DOCUMENTS 7,346,126 B2* 3/2008 Nilsson et al. .............. 375/316
7,386,032 B2* 6/2008 Fitton et al. ................. 375/147
2002/0060996 A1 5/2002 Kwak et al.

* cited by examiner

UNIVERSAL DEROTATOR FOR UMTS MODES

FIELD OF THE INVENTION

The invention relates to a method for processing received signals in a digital mobile communication system, and a receiver.

BACKGROUND OF THE INVENTION

In UMTS, a plurality of transmission modes are provided. In Normal transmission mode, data bits representing transmitted information are sent from one antenna of a Node B in ordered temporal sequence. In Open Loop Transmit Diversity mode, data bits representing transmitted information are sent from two antennas of a Node B, and are sent in different temporal order from the two antennas. In Closed Loop Transmit Diversity modes 1 and 2, the data bits representing the transmitted information are sent in ordered temporal sequence from each of the two antennas of the Node B, but the bits are weighted differently for each antenna. The transmitted information is of a multitude of types, each having their special temporal reordering depending on the transmission mode.

At the receiving side. User Equipment (UE) has to handle all of the transmission modes for the different types information. This can be accomplished by implementing a plurality of reception paths, each adapted to take care of a certain type of information at a certain transmission mode. However, parallel processing paths will occupy more circuit area, consume more power, and increase costs. WO 01/06695 A1 discloses an example how pilot signals are received and handled for producing a channel estimate during an open loop transmit diversity mode. A problem with WO 01/06695 is that it cannot process more than the case when pilot symbols are present, and during open loop transmit diversity transmission mode. A multitude of solutions like the one disclosed in WO 01/06695, but for other transmission modes and channel types requiring other handling, has to be implemented in parallel in the UE. The requirements on the UE to be small and to have low power consumption are hard to meet in view of the multitude of reception paths, as cost requirements on the UE are considered. Different transmission modes for Frequency Division Duplex (FDD) transmission for Universal Mobile Telecommunication System (UMTS), Release 99 (R99), standard requires different processing for demodulation of a received signal. Parallel hardware processing paths for these different received signals for different modes require an extensive hardware implementation.

SUMMARY OF THE INVENTION

Therefore, an object of the present invention is to provide a solution that overcomes the problem of the prior art.

At least the above object is obtained according to a first aspect of the present invention by a mobile communication apparatus comprising a receiver, a derotator, a demodulator and a processor, wherein the receiver is connected to the derotator, the derotator is connected to the demodulator, and the controller is connected to the receiver, derotator and demodulator, wherein the derotator comprises a first means for processing Primary Common Control Physical Channel during Space Time coding based Transmit Diversity transmission mode; a second means for processing pilot symbols; a third means for processing symbols during closed loop transmission modes; and a fourth means for outputting symbols to the demodulator in a temporal ordered sequence, wherein the first, second, third and fourth means are connected in series.

A particular advantage of derotator means connected in series is enabling all signal types in all transmission modes to be processed by one universal derotator.

The first means may be transparent to symbols other than symbols related to Primary Common Control Physical Channel during Space Time coding based Transmit Diversity transmission mode. The first means may be arranged to delete a first symbol related to Primary Common Control Physical Channel of every slot during Space Time coding based Transmit Diversity transmission mode.

The second means may be transparent to other symbols than pilot symbols, and the third means may be transparent during other transmission modes than closed loop transmission modes.

A particular advantage of transparency features relates to versatility of the derotator, thus enabling each means to contribute to the derotation only as much as is needed.

The derotator may comprise a plurality of two-position switches. A particular advantage of this feature relates to processing of the received signal by a plurality of switches, thus enabling an implementation with low demands on chip area, concise control signalling, and low power consumption.

A particular advantage of the present invention is that only one hardware processing path has to be implemented.

At least the above object is achieved according to a second aspect of the present invention by a method of derotating received symbols in a mobile communication apparatus, the method comprising the steps of:

processing Primary Common Control Physical Channel during Space Time coding based Transmit Diversity transmission mode;

processing pilot symbols;

processing symbols during closed loop transmission modes; and outputting symbols in a temporal ordered sequence.

A particular advantage of the method for derotating received symbols is that all signal types in all transmission modes can be processed by one universal method for derotation.

The step of processing Primary Common Control Physical Channel during Space Time coding based Transmit Diversity transmission mode may comprise deleting a first symbol related to Primary Common Control Physical Channel of every slot during Space Time coding based Transmit Diversity transmission mode.

The step of processing pilot symbols may comprise processing a compressed mode by the steps of:

summing two pilot symbols; and dividing the sum of said two pilot symbols by two.

The step of outputting symbols may comprise dividing the symbols by two when transmit diversity is present. A particular advantage of this feature is that the dynamic range of output symbols is constant, independent of presence of transmit diversity.

DESCRIPTION OF THE PREFERRED EMBODIMENTS

Figure 1:
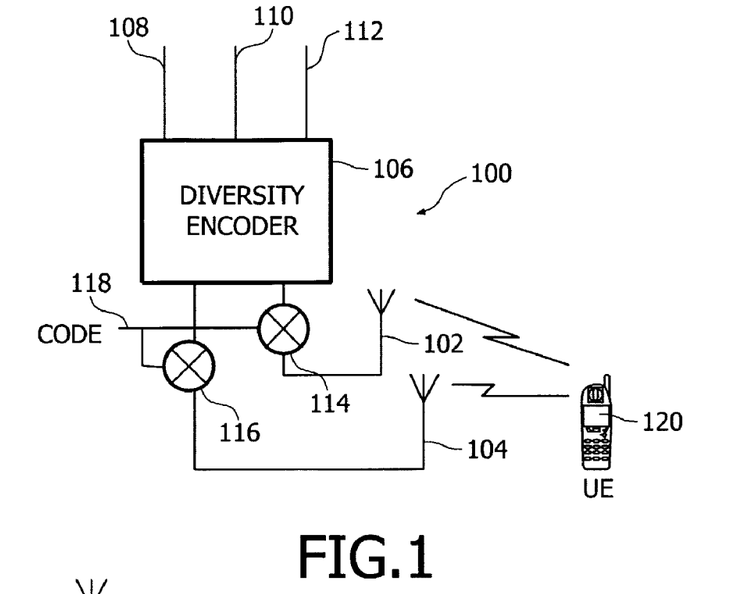
FIG. 1 shows a part of a mobile telecommunication system.

FIG. 1 shows a part of a mobile telecommunication system, e.g. a UMTS system, comprising a transmitter 100 having several components including a first antenna 102 and a second antenna 104. The transmitter 100 further comprises a diversity encoder 106 adapted to feed the first and second antennas 102, 104. The diversity encoder 106 is arranged to input a multitude of signal types 108, 110, 112 and to output appropriate symbols according to UMTS R99 specification, which will be further described below, to a first spreader 114 associated with the first antenna 102, and to a second spreader 116 associated with the second antenna 104. The first and second spreaders 114, 116 are provided with a channelling code and a long scrambling code, here for the sake of simplicity denoted as a code 118, for spreading the signal before transmission by the first and second antennas 102, 104 to a User Equipment (UE) 120.

According to the UMTS R99 specification, four transmission modes are provided with regard to transmit diversity in downlink transmission. Normal transmit mode is considered as a transmit diversity mode, although no transmit diversity is provided.

In open loop transmit diversity, also called Space Time block coding based Transmit Diversity (STTD), different symbols are provided from the two antennas to enable the UE to derive individual channel estimates for the antennas.

The third and fourth transmission modes are closed loop transmit diversity modes, where the third transmission mode is Closed Loop Transmit mode 1, also called Feed Back Mode 1 (FMB1). The UE sends weights to the Node B, which multiplies weights to the symbols transmitted on each antenna. In FMB1, the weights for the antennas are normalized such that the weight for one of the antennas is a constant normalized value.

The fourth mode is Closed Loop Transmit mode 2, also called Feed Back Mode 2 (FMB2), which differs from FMB1 in that there is also a phase information in the weights. In FMB1 and FMB2, the same symbols, apart from the multiplication of weights, are sent on both of the antennas in ordered temporal sequence.

Figure 2:
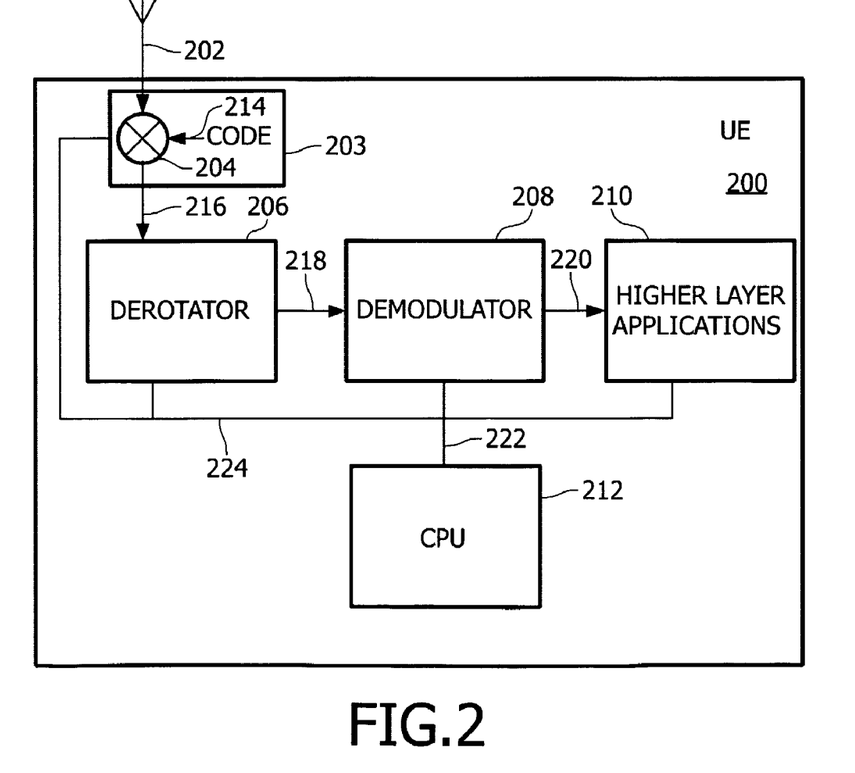
FIG. 2 shows a schematic block diagram of a UE.

FIG. 2 shows a schematic block diagram of a UE 200 comprising an antenna 202, a receiver 203, a derotator 206, a demodulator 208, higher layer application block 210, and a central processing unit 212. The antenna 202 is arranged to receive a signal transmitted from a Node B. The antenna 202 is connected to the receiver 203, which comprises a despreader 204. The signal is despread by the despreader 204 with a channelling code and a long scrambling code, here for the sake of simplicity denoted as a code 214. The despread signal 216 is fed to the derotator 206. The derotator 206 is adapted to process the different transmission modes in a manner described below, to produce a derotated signal 218. The derotated signal 218 is fed to the demodulator 208 for demodulating the received information 220 which is fed to the higher layer application block 210. The higher layer application block 210 is a generic name for all other parts comprised in the UE, and will not be described further for the sake of simplicity. The CPU 212 is arranged to control the overall function of the UE, and the derotator 206, the demodulator 208 and the higher layer application block 210 are controlled by control signals 222. The CPU provides e.g. a counter pointing out pilot bits by time instants T1-T4, a compressed mode slot format indicator, a transmission mode indicator, channel estimates and weights for the two transmit antennas, a counter for slots and frames and number of pilot bits used. The CPU is illustrated as a single block, but may of course comprise one or more physical processing units. The functionality of the derotator 206 is controlled by a control signal 224 from the CPU 212.

Figure 3:
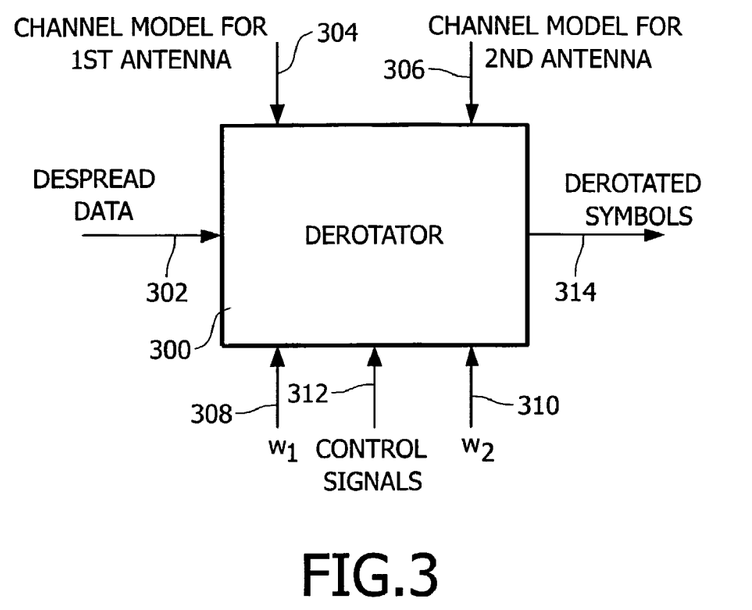
FIG. 3 shows a block diagram of a derotator.

FIG. 3 shows a block diagram of a derotator 300 comprised in a receiver according to the present invention. The derotator 300 is fed with despread data 302, a channel model 304 for a first antenna at transmission side, a channel model 306 for a second antenna at transmission side, a first weight $w_1$ 308 associated with the first antenna in closed loop transmission modes, a second weight $w_2$ 310 associated with the second antenna in closed loop transmission modes, and a plurality of control signals 312. The derotator 300 is arranged to output derotated symbols 314. The derotator 300, the input signals 302, 304, 306, 308, 310, 312, and the functionality of the derotator 300 will be described in more detail below.

Figure 4:
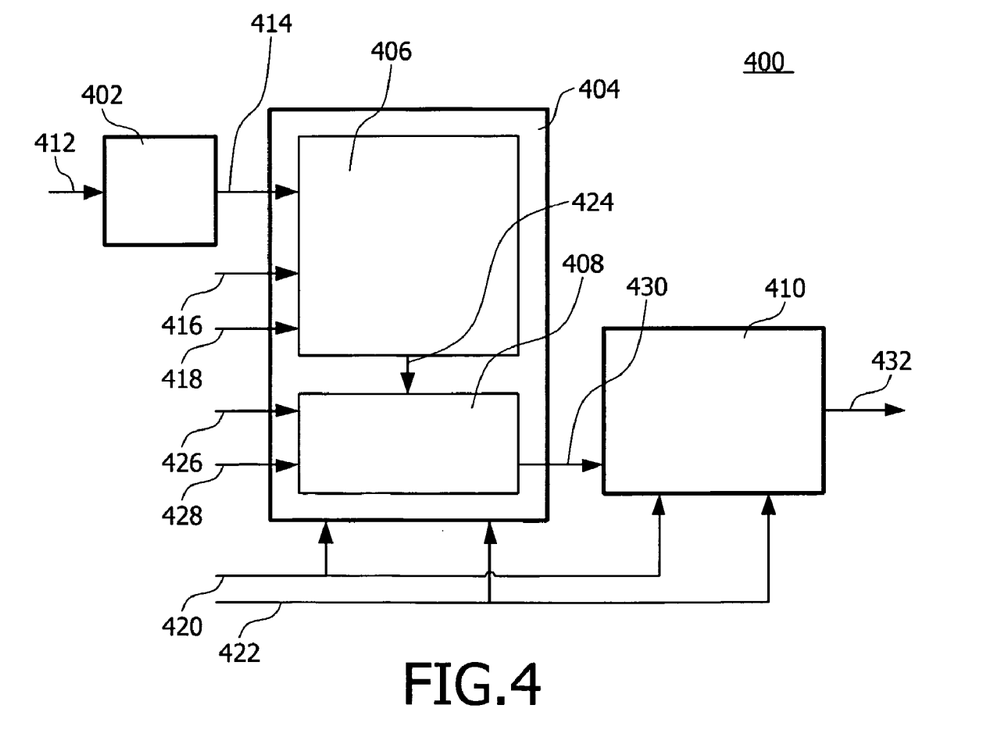
FIG. 4 shows a block diagram of a derotator.

FIG. 4 shows a block diagram of the derotator 300 of FIG. 3. The derotator 400 comprises a block 402 processing special properties of a Primary Common Channel Physical Channel (P-CCPCH). The derotator further comprises a first derotator block 404 comprising a pilot derotator sub-block 406 and a derotator sub-block 408. The derotator 400 further comprises a second derotator block 410.

The P-CCPCH processor block 402 is fed with despread symbols 412. The P-CCPCH processor block 402 is arranged to treat the despread symbols 412 such that output symbols 414 from the P-CCPCH block can be normally treated by the subsequent blocks 404, 410, if the despread symbols 412 emanate from a P-CCPCH transmission using STTD. If the despread symbols 412 do not emanate from a P-CCPCH transmission using STTD, the P-CCPCH processor block 402 is arranged to treat the despread symbols 412 such that output symbols 414 from the P-CCPCH block are identical with the despread symbols 412 at the input of the P-CCPCH processor block 402. The P-CCPCH processor block 402 will be further described below.

The pilot derotator sub-block 406 is fed with the output symbols 414 from the P-CCPCH processor block 402, a channel estimate 416 associated with a first antenna, a channel estimate 418 associated with a second antenna, a transmit diversity indication signal 420, and a compressed mode slot format type indicator 422. A plurality of parameters, control signals and functions are also provided for the pilot derotator sub-block 406, and will be described in further detail below. The output 424 of the pilot derotator sub-block 406 is fed to the derotator sub-block 408.

The derotator sub-block 408 is fed with the output 424 of the pilot derotator sub-block 406, a first weight $w_1$ 426 associated with the first antenna at closed loop transmission modes, a second weight $w_2$ 428 associated with the second antenna at closed loop transmission modes, and a transmit diversity indication signal 420. A plurality of parameters, control signals and functions are also provided for the derotator sub-block 408, and will be described in further detail below. The output 430 of the derotator sub-block 408 is fed to the second derotator block 410.

The second derotator block 410 is fed with the output 430 of the derotator sub-block 408, and a transmit diversity indication signal 420. A plurality of parameters, control signals and functions are also provided for the second derotator block 410, and will be described in further detail below. The output 432 of the second derotator block 410, which comprises the derotated symbols, is fed to a demodulator.

Figure 5:
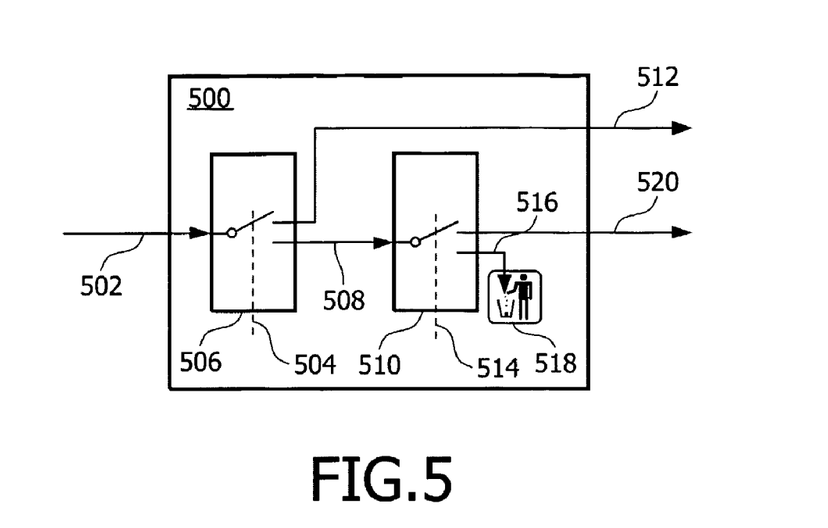
FIG. 5 shows a P-CCPCH processor block.

FIG. 5 shows the P-CCPCH processor block 402 of FIG. 4. The P-CCPCH processor block 500 is fed with despread symbols 502. If the despread symbols 502 emanate from a P-CCPCH transmission using STTD, i.e. a transmit diversity indication signal (not shown in FIG. 5) indicating STTD transmission mode, a first P-CCPCH processor control signal 504 is arranged to cause a first P-CCPCH processor switch 506 to connect the despread symbols 502 to an output 508 coupled to a second P-CCPCH processor switch 510. Otherwise, the first P-CCPCH processor control signal 504 is arranged to cause the first P-CCPCH processor switch 506 to connect the despread symbols 502 to an output 512 of the P-CCPCH processor, i.e. the P-CCPCH processor block 500 treats the despread symbols 502 such that output symbols 512 from the P-CCPCH block are identical to the despread symbols 502 at the input of the P-CCPCH processor block 500.

A second P-CCPCH processor control signal 514 is arranged to cause the second P-CCPCH processor switch 510 to output every symbol 516 that is a multiple of ten (first symbol of every slot) to a dump 518 and to freeze all the following units (switches, timer, control signals) during this symbol, since the transmission is turned off during this symbol. This is controlled by a symbol counter (not shown in FIG. 5). Thus, the P-CCPCH output symbols 520 can be normally treated by the subsequent blocks during STTD transmission mode.

Figure 6:
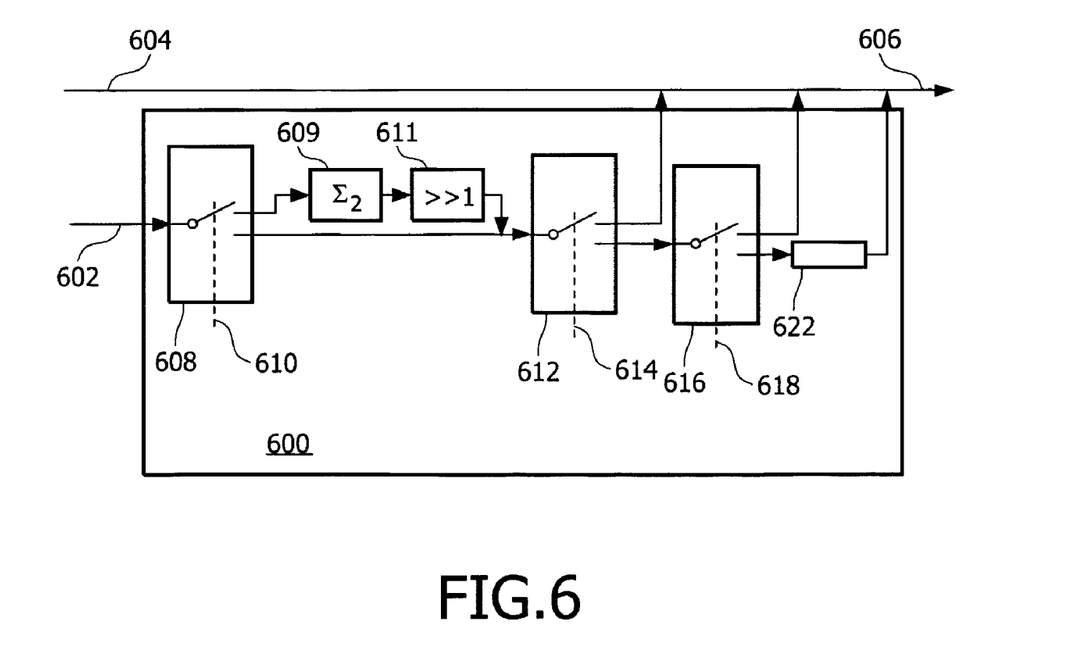
FIG. 6 shows a pilot derotator sub-block.

FIG. 6 shows the pilot derotator sub-block 406 of FIG. 4. The pilot derotator sub-block 600 is fed with pilot symbols 602, and non-pilot symbols 604, such as data, Transmit Power Control (TPC), and Transport Format Combination Indicator (TFCI) symbols, from the P-CCPCH processor block 500 in FIG. 5. The pilot derotator sub-block is transparent to non-pilot symbols 604, which are directly routed to an output 606 of the pilot derotator sub-block. The pilot symbols 602 are fed to a first switch 608, which is controlled by a first control signal 610.

The first control signal 610 is arranged to cause switch 608 to route pilot symbols directly to a second switch 612 if there is no compressed mode. The first control signal 610 is also arranged to cause switch 608 to route the symbols, if there is compressed mode, to a pilot symbol summer 609, which is arranged to sum two following pilot symbols. The summed pilot symbols are then routed to a bit shifter 611. The summed pilot symbols are divided by two, i.e. the bits are shifted one position to the right in the bit shifter 611, and the shifted result is routed to a second switch 612. In this way, a compressed mode for pilots bits is transformed to an equivalent of non-compressed mode with the number of pilot bits divided by two. In other words, if there was compressed mode, 32 bits become 16 bits, 16 bits become 8 bits, 8 bits become 4 bits and 4 bits become 2 bits, after the first switch 608, the pilot symbol summer 609 and the bit shifter 611.

The second control signal 614 is arranged to cause the second switch 612 to route the pilot symbols to the output 606 when a transmit diversity indication signal is indicating normal or FMB2 transmission mode. The second control signal 614 is also arranged to cause the second switch 612 to route the pilot symbols to the output 606 when the transmit diversity indication signal is indicating STTD transmission mode and the number of pilot bits is two or four. The second control signal 614 is also arranged to cause the second switch 612 to route the pilot symbols to the output 606 when the transmit diversity indication signal is indicating FMB1 transmission mode and the number of pilot bits is four. The second control signal 614 is also arranged to cause the second switch 612 to route the pilot symbols to a third switch 616 when the transmit diversity indication signal is indicating STTD or FBM1 transmission mode and the number of pilot bits is 8, or 16.

The third switch 616 is controlled by a third control signal 618. The third control signal 618 is arranged to cause the third switch 616 to route the pilot symbols to the output 606 when the time instant is T1 or T3. The third control signal 618 is arranged to cause the third switch 616 to route the pilot symbols to a buffer when the time instant is T2 or T4. The output of the buffer 622 is connected to the output 606.

The functionality described in relation to FIG. 6 is a preferred embodiment according to the present invention, taking care of derotation of pilot symbols according to UMTS R99 specification. However, the principle of derotation according to the illustrative example above is not limited to UMTS R99 specification, and may be adapted to any telecommunication standard.

Figure 7:
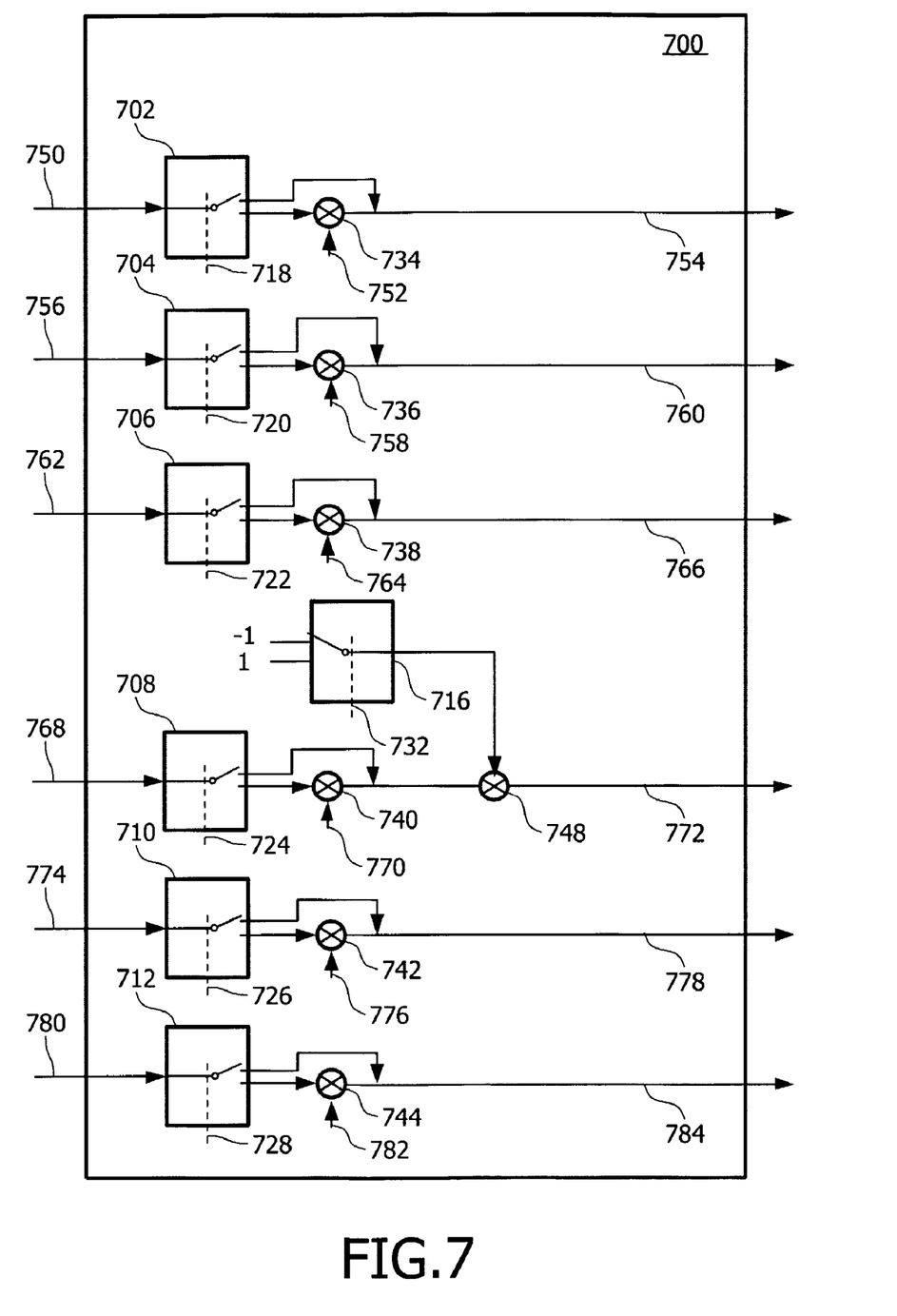
FIG. 7 shows a derotator sub-block.

FIG. 7 shows the derotator sub-block 408 of FIG. 4. The derotator sub-block 700 comprises a plurality of switches 702, 704, 706, 708, 710, 712, 716 controlled by a plurality of control signals 718, 720, 722, 724, 726, 728, 732. The derotator sub-block further comprises a plurality of multipliers 734, 736, 738, 740, 742, 744, 748. In the preferred embodiment, the value of the control signals 718, 720, 722, 724, 726 and 728 is equal.

A first switch 702 is fed with an estimate of a conjugated first channel model 750 for a second transmitter antenna (104 in FIG. 1). A first control signal 718 is arranged to cause the estimate of the conjugated first channel model 750 for the second transmitter antenna to be switched to a first multiplier 734 when the transmission mode is FMB1 or FMB2. The first multiplier 734 is arranged to multiply the estimate of the conjugated first channel model 750 for the second transmitter antenna with a weight 752 associated with the second antenna at closed loop transmission modes, and the result of the multiplication is fed to the output 754. The first control signal 718 is arranged to cause the estimate of the conjugated first channel model 750 for the second transmitter antenna to be switched to the output 754 when the transmission mode is Normal or STTD.

A second switch 704 is fed with an estimate of a first channel model 756 for a second transmitter antenna (104 in FIG. 1). A second control signal 720 is arranged to cause the estimate of the first channel model 756 for the second transmitter antenna to be switched to a second multiplier 736 when the transmission mode is FMB1 or FMB2. The second multiplier 736 is arranged to multiply the estimate of the first channel model 756 for the second transmitter antenna with a conjugated weight 758 associated with the second antenna at closed loop transmission modes, and the result of the multiplication is output 760. The second control signal 720 is arranged to cause the estimate of the first channel model 756 for the second transmitter antenna to be switched to the output 760 when the transmission mode is Normal or STTD.

A third switch 706 is fed with an estimate of a first channel model 762 for a first transmitter antenna (102 in FIG. 1). A third control signal 722 is arranged to cause the estimate of the first channel model 762 for the first transmitter antenna to be switched to a third multiplier 738 when the transmission mode is FMB1 or FMB2. The third multiplier 738 is arranged to multiply the estimate of the first channel model 762 for the first transmitter antenna with a conjugated weight 764 associated with the first antenna at closed loop transmission modes, and a result of the multiplication is output 766. The third control signal 722 is arranged to cause the estimate of the first channel model 762 for the first transmitter antenna to be switched to the output 766 when the transmission mode is Normal or STTD.

A fourth switch 708 is fed with an estimate of a conjugated second channel model 768 for a second transmitter antenna (104 in FIG. 1). A fourth control signal 724 is arranged to cause the estimate of the conjugated second channel model 768 for the second transmitter antenna to be switched to a fourth multiplier 740 when the transmission mode is FMB1 or FMB2. The fourth multiplier 740 is arranged to multiply the estimate of the conjugated second channel model 768 for the second transmitter antenna with a weight 770 (equal to weight 752) associated with the second antenna at closed loop transmission modes, and the result of the multiplication is fed to a fifth multiplier 748. The fourth control signal 724 is arranged to cause the estimate of the conjugated second channel model 768 for the second transmitter antenna to be switched to the fifth multiplier 748 when the transmission mode is Normal or STTD. The weighted or unweighted estimate of the conjugated second channel model 768 for the second transmitter antenna is multiplied by −1 at the fifth multiplier 748 when the transmission mode is Normal, STTD or FBM1. Otherwise, the weighted or unweighted estimate of the conjugated second channel model 750 for the second transmitter antenna is multiplied by 1 at the fifth multiplier 748. The result 772 from the multiplier 748 is output.

A sixth switch 710 is fed with an estimate of a second channel model 774 for a first transmitter antenna (102 in FIG. 1). A sixth control signal 726 is arranged to cause the estimate of the second channel model 774 for the first transmitter antenna to be switched to a sixth multiplier 742 when the transmission mode is FMB1 or FMB2. The sixth multiplier 742 is arranged to multiply the estimate of the second channel model 774 for the first transmitter antenna with a conjugated weight 776 associated with the first antenna at closed loop transmission modes, and the result of the multiplication is output 778. The sixth control signal 726 is arranged to cause the estimate of the second channel model 774 for the first transmitter antenna to be switched to the output 778 when the transmission mode is Normal or STTD.

A seventh switch 712 is fed with an estimate of a second channel model 780 for a second transmitter antenna (104 in FIG. 1). A seventh control signal 728 is arranged to cause the estimate of the second channel model 780 for the second transmitter antenna to be switched to a seventh multiplier 744 when the transmission mode is FMB1 or FMB2. The seventh multiplier 744 is arranged to multiply the estimate of the second channel model 780 for the second transmitter antenna by a conjugated weight 782 associated with the second antenna at closed loop transmission modes, and the result of the multiplication is output 784. The seventh control signal 728 is arranged to cause the estimate of the second channel model 780 for the second transmitter antenna to be switched to the output 784 when the transmission mode is Normal or STTD.

Figure 8:
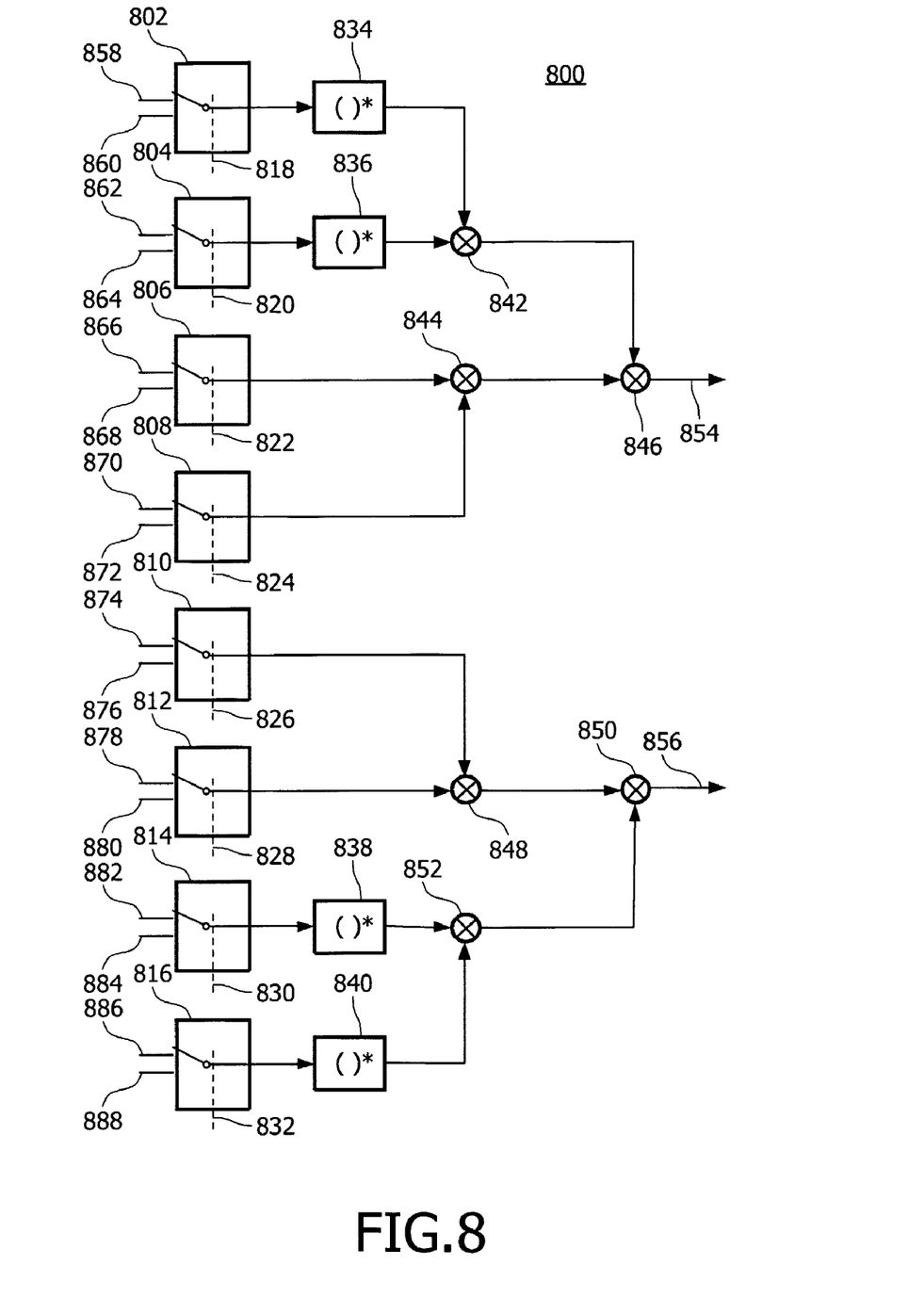
FIG. 8 shows a first part of a second derotator block.

FIG. 8 shows a first part of the second derotator block 410 of FIG. 4. The first part 800 of the second derotator block comprises a plurality of switches 802, 804, 806, 808, 810, 812, 814, 816 controlled by a plurality of control signals 818, 820, 822, 824, 826, 828, 830, 832. In the preferred embodiment, the value of the control signals 818, 820, 822, 828, 830 and 832 is equal, and the value of the control signals 824 and 826 is equal. The first part 800 of the second derotator block further comprises a plurality of conjugators 834, 836, 838, 840 and a plurality of multipliers 842, 844, 846, 848, 850, 852.

Control signals 818, 820, 822, 828, 830, 832 are arranged to cause the switches 802, 804, 806, 812, 814, 816 to switch according to a first state when a pilot field is present and transmission mode is FMB2, a pilot field is present and transmission mode is STTD or FMB1, the number of pilot bits are 8 or 16, and the time instant is T1 or T3, or a pilot field is not present and the transmission mode is FMB1 or FMB2. Otherwise the control signals 818, 820, 822, 828, 830, 832 are arranged to cause the switches 802, 804, 806, 812, 814, 816 to switch according to a second state. In case of transmission of P-CCPCH with STTD, control signals 818, 820, 822, 828, 830 and 832 are always arranged to cause the switches 802, 804, 806, 812, 814, 816 to switch according to the second state, except for the last symbol of each frame, when they are all caused to switch according to the first state.

Control signals 824, 826 are arranged to cause the switches 808, 810 to switch according to a first state when a pilot field is present and transmission mode is FMB2, a pilot field is present, the transmission mode is STTD or FMB1, and the number of pilot bits are 2, 4, 8 or 16, or a pilot field is not present and the transmission mode is FMB1 or FMB2. Otherwise the control signals 824, 826 are arranged to cause the switches 808, 810 to switch according to a second state. In case of transmission of P-CCPCH with STTD, control signals 824 and 826 are always arranged to cause the switches 808, 810 to switch according to the first state.

A first switch 802 is fed with the output signals 754, 760 of the derotator sub-block in FIG. 7. The first switch 802 is arranged to output an input signal 858 (equal to output signal 754 in FIG. 7) when in the first state, and an input signal 860 (equal to output signal 760 in FIG. 7) when in the second state.

A second switch 804 is fed with a conjugated first symbol 862 and a second symbol 864. The second switch 804 is arranged to output the conjugated first symbol 862 when in the first state, and the second symbol 864 when in the second state.

A third switch 806 is fed with the outputs 766, 778 of the derotator sub-block in FIG. 7. The third switch 806 is arranged to output an input signal 866 (equal to output signal 766) when in the first state, and an input signal 868 (equal to output signal 778) when in the second state.

A fourth switch 808 is fed with the first symbol 870 and the second symbol 872. The fourth switch 808 is arranged to output the first symbol 870 when in the first state, and the second symbol 872 when in the second state.

A fifth switch 810 is fed with the second symbol 874 and the first symbol 876. The fifth switch 810 is arranged to output the second symbol 874 when in the first state, and the first symbol 876 when in the second state.

A sixth switch 812 is fed with the output signals 778, 766 of the derotator sub-block in FIG. 7. The sixth switch 812 is arranged to output an input signal 878 (equal to output signal 778) when in the first state, and an input signal 880 (equal to output signal 766) when in the second state.

A seventh switch 814 is fed with the output signals 772, 784 of the derotator sub-block in FIG. 7. The seventh switch 814 is arranged to output an input signal 882 (equal to output signal 772) when in the first state, and an input signal 884 (equal to output signal 784) when in the second state.

An eighth switch 816 is fed with the conjugated second symbol 886 and the inverted first symbol 888. The eighth switch 816 is arranged to output the conjugated second symbol 886 when in the first state, and the inverted first symbol 888 when in the second state.

The output from the first switch 802 is fed to a first conjugator 834, and the conjugated result is fed to a first multiplier 842. The output from the second switch 804 is fed to a second conjugator 836, and the conjugated result is fed to the first multiplier 842. The multiplied result is fed to a second multiplier 846.

The output from the third and fourth switches 806, 808 is fed to a third multiplier 844, and the multiplied result is fed to the second multiplier 846. The multiplied result from the second multiplier 846 is the first output 854 of the first part 800 of the second derotator block.

The output from the fifth and sixth switches 810, 812 is fed to a fourth multiplier 848, and the multiplied result is fed to a fifth multiplier 850.

The output from the seventh switch 814 is fed to a third conjugator 838, and the conjugated result is fed to a sixth multiplier 852. The output from the eighth switch 816 is fed to a fourth conjugator 840, and the conjugated result is fed to the sixth multiplier 852. The multiplied result is fed to the fifth multiplier 850. The multiplied result from the fifth multiplier 850 is the second output 856 of the first part 800 of the second derotator block.

Figure 9:
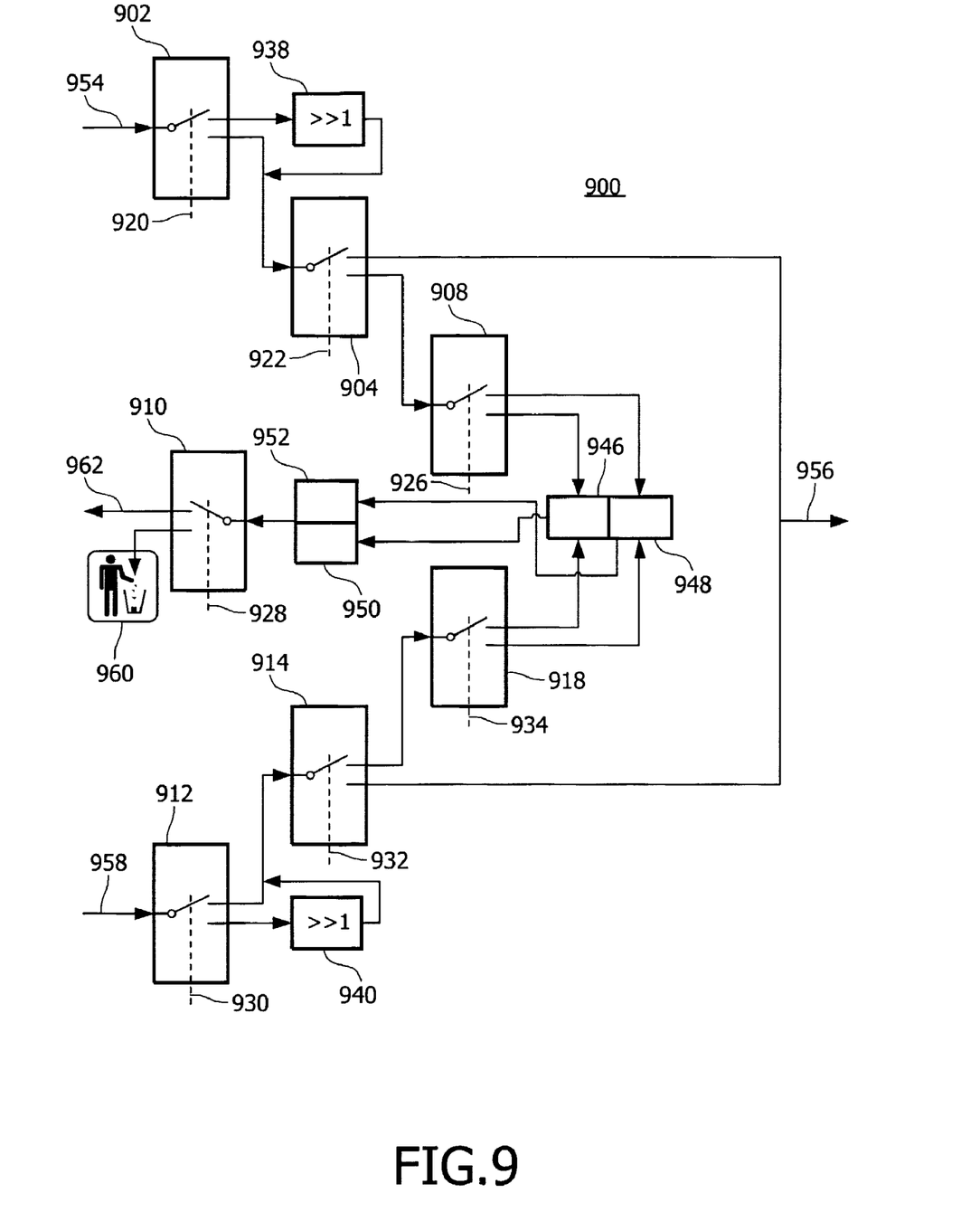
FIG. 9 shows a second part of the second derotator block.

FIG. 9 shows a second part of the second derotator block 410 of FIG. 4. The second part 900 of the second derotator block comprises a plurality of switches 902, 904, 908, 910, 912, 914, 918 controlled by a plurality of control signals 920, 922, 926, 928, 930, 932, 934. The second part 900 of the second derotator block further comprises a first and a second shifter 938, 940, a first and a second primary output register 946, 948, and a first and a second secondary output register 950, 952.

A first switch 902 is fed with the output 854 of the first part of the second derotator block in FIG. 8. A first control signal 920 is arranged to cause an input 954 (equal to output signal 854 in FIG. 8) of the first switch 902 to be switched to a first shifter 938 when there is transmit diversity present on at least one finger of a rake receiver, otherwise the input 954 of the first switch 902 is caused to be switched to a second switch 904. The first shifter 938 is arranged to shift the output of the first switch one bit to the right, i.e. drop one least significant bit. The output of the first shifter 938 is fed to the second switch 904.

The second switch 904 is caused by a second control signal 922 to switch the input to the derotated pilot symbol output 956 when a pilot field is present and transmission mode is STTD or FMB1, and the number of pilot bits is 8, or 16. Otherwise, the second switch 904 is caused by the second control signal 922 to switch the input to a fourth switch 908.

The third switch 908 is caused by a third control signal 926 to switch the input to the first primary register 946 when the transmission mode is STTD, otherwise to the second primary register 948.

A fourth switch 912 is fed with the output 856 of the first part of the second derotator block in FIG. 8. A fourth control signal 930 is arranged to cause an input 958 (equal to output signal 856 in FIG. 8) of the fourth switch 912 to be switched to a second shifter 940 when transmit diversity is present on at least one finger of a rake receiver, otherwise the fourth switch 912 is caused to switch the input 958 to a fifth switch 914. The second shifter 940 is arranged to shift the output of the fourth switch one bit to the right, i.e. drop one least significant bit. The output of the second shifter 940 is fed to the fifth switch 914.

The fifth switch 914 is caused by a fifth control signal 932 to switch the input to the derotated pilot symbol output 956 when a pilot field is present and transmission mode is STTD or FMB1, and the number of pilot bits is 8, or 16. Otherwise, the fifth switch 914 is caused by the fifth control signal 932 to switch the input to a sixth switch 918.

The sixth switch 918 is caused by a sixth control signal 934 to switch the input to the second primary register 948 when the transmission mode is STTD, otherwise to the first primary register 946.

The output of the first primary register 946 is fed to the first secondary register 950. The output of the second primary register 948 is fed to the second secondary register 952. A complex output of the first and second secondary registers is fed to a ninth switch 910.

The seventh switch 910 is caused by a seventh control signal 928 to switch the input to a dump 960 transmission of a P_CCPCH with STTD is present. Otherwise, the seventh switch 910 is caused by a seventh control signal 928 to switch the input to a derotated symbol output 962.

It is to be noted that in the preferred embodiment, the output derotated pilot symbols do not exit the derotator in the same order they were transmitted, but rather in the order $1^{st}$, $3^{rd}$, $2^{nd}$, $4^{th}$. This will be taken into account in the demodulator. Other orders are possible, and in principle can any predetermined temporal ordered sequence be used.

It is also to be noted that the different blocks that have been described above in relation to FIGS. 1-9 are functional blocks and do not necessarily correspond to actual hardware units in a one-to-one relationship. As the skilled person will realize, functionality comprised in the blocks of FIGS. 1-9 may, wholly or in part, be comprised in one or more integrated circuits in the form of any mixture of programmable and non-programmable circuits.

Figure 10:
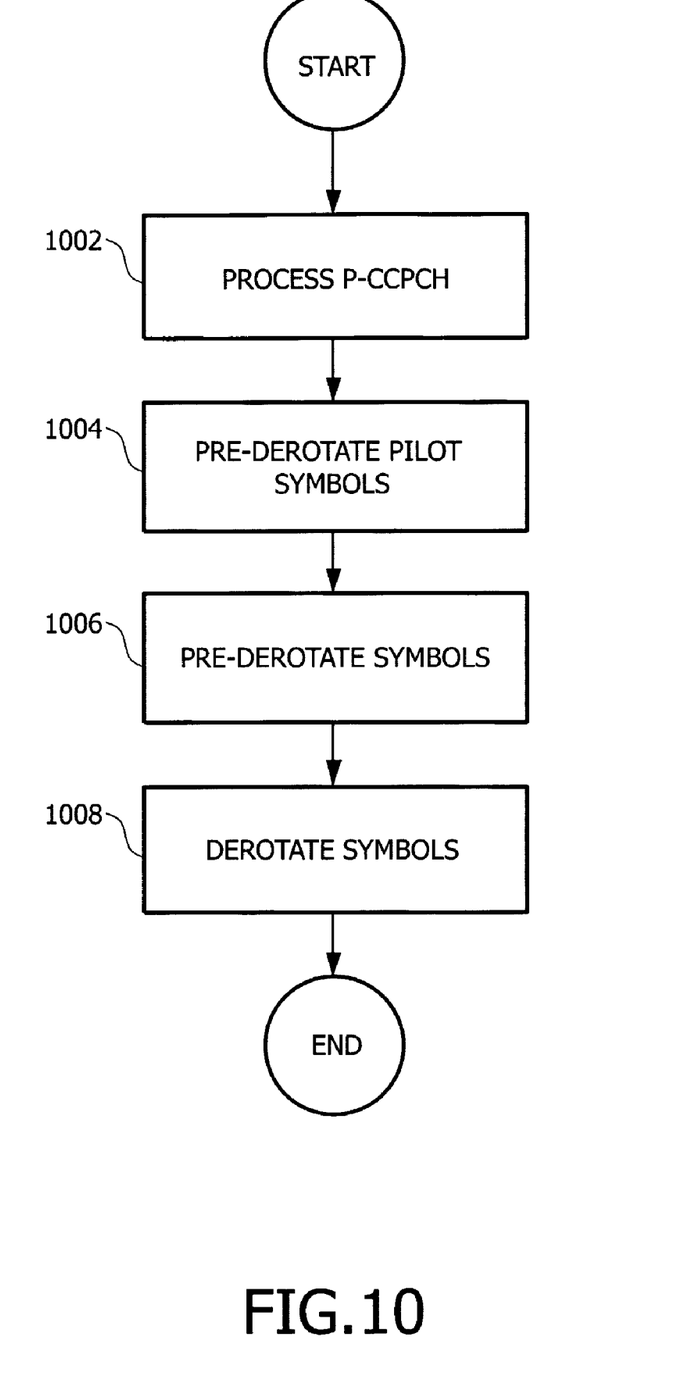
FIG. 10 shows a method for derotating received symbols.

FIG. 10 shows a method for derotating received symbols. A P-CCPCH processing step 1002 processes special properties of P-CCPCH symbols during STTD, as will be described below together with FIG. 11. A pilot symbol pre-derotation step 1004 pre-derotates pilot symbols, as will be described below together with FIG. 12, to enable further processing together with non-pilot symbols. A pre-derotation step 1006 processes channel estimates according to different transmission modes and symbol types, as will be described below together with FIG. 13. A derotation step 1008 finally derotates the received symbols and outputs the derotated symbols in temporal order, as will be described below together with FIG. 14.

Figure 11:
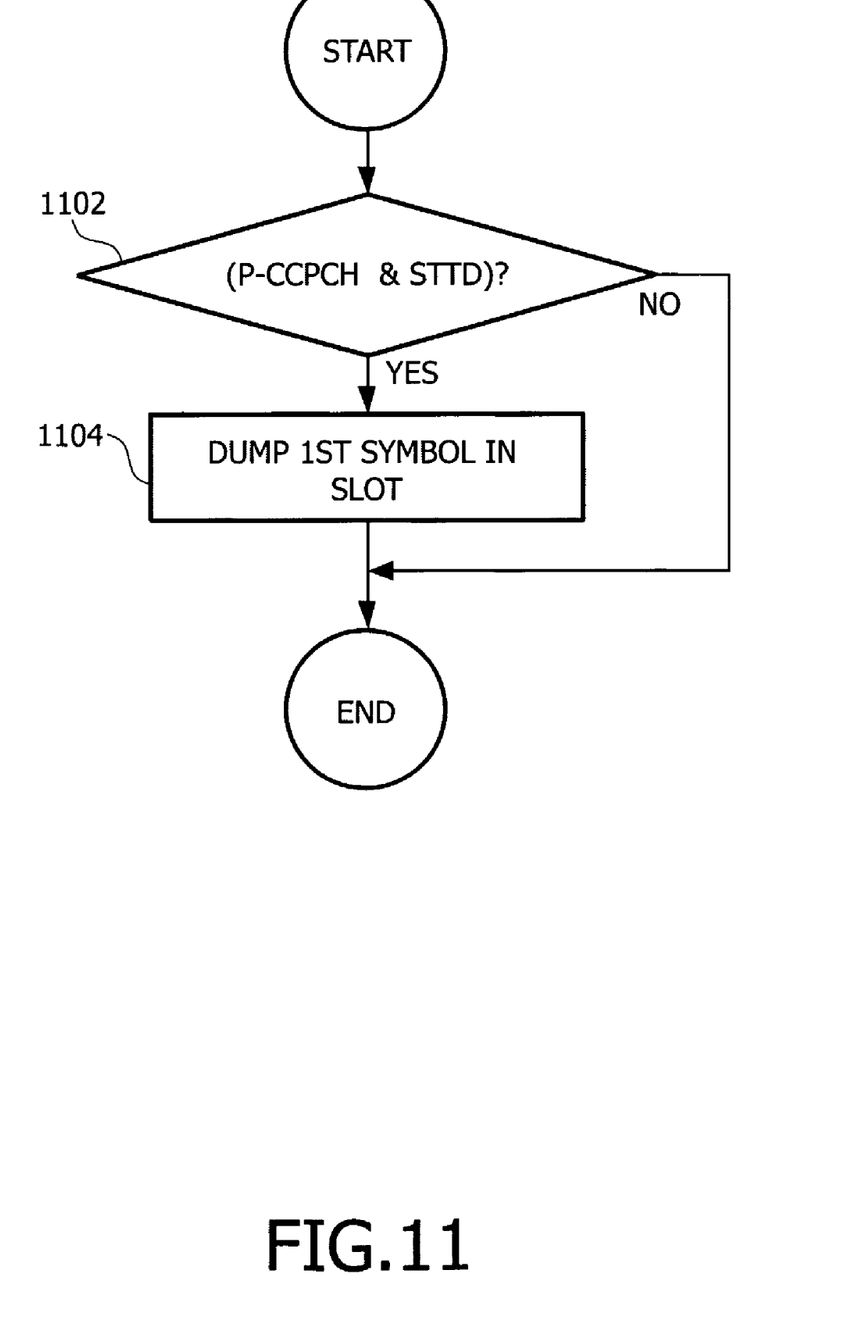
FIG. 11 shows a processing step.

FIG. 11 shows the processing step 1002 of FIG. 10. The processing step comprises a determination step 1102 and a symbol dump step 1104. The determination step 1102 determines if a P-CCPCH symbol is sent in STTD transmission mode. If it is, the first symbol of a current slot is dumped, since transmission is turned off. In other cases, no action is performed.

Figure 12:
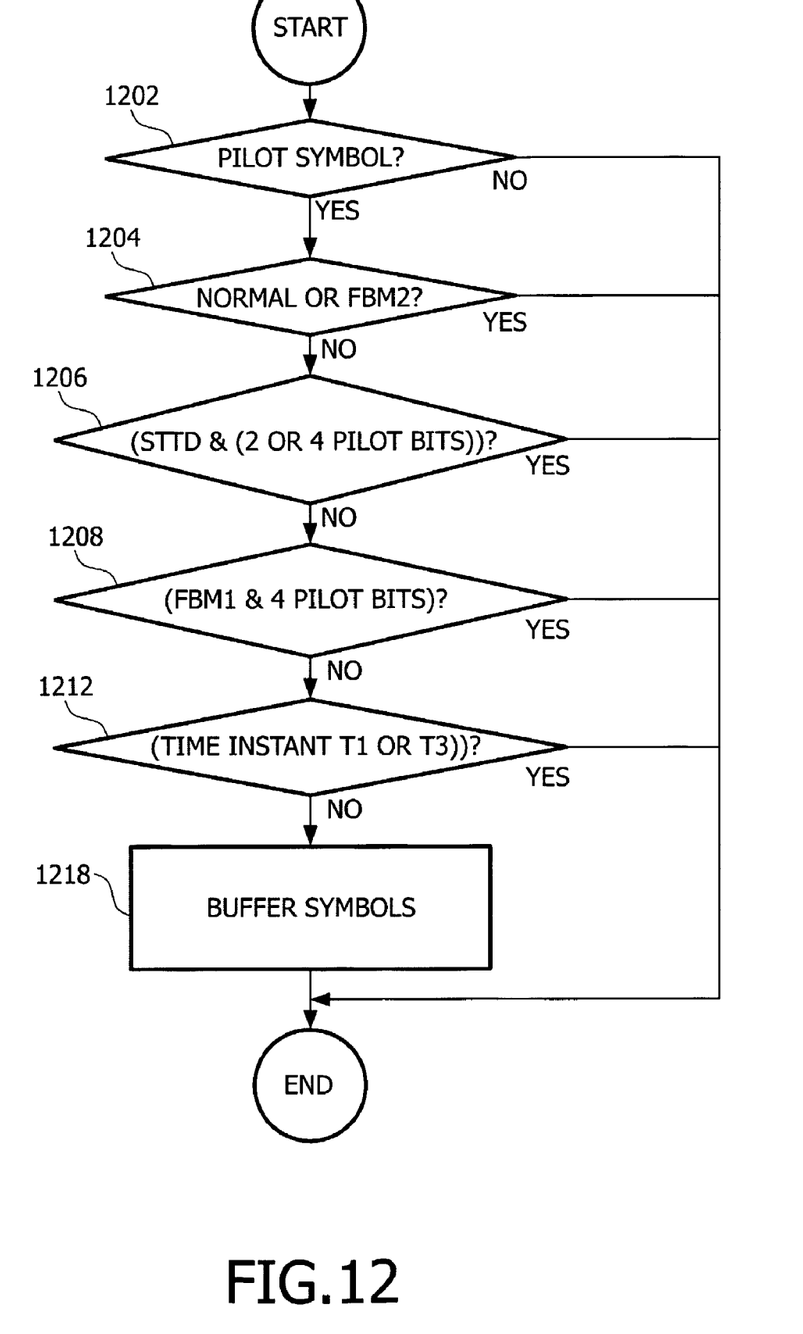
FIG. 12 shows a pilot symbol pre-derotation step.

FIG. 12 shows the pilot symbol pre-derotation step 1004 of FIG. 10. A pilot symbol determination step 1202 determines if a pilot field is present. If not, no action is performed, and the method continues with pre-derotation step 1006 in FIG. 10. If it is, the method continues with a transmission mode determination step 1204 which determines if transmission mode is Normal or FMB2. If it is, no action is performed and the method continues with pre-derotation step 1006 in FIG. 10. If not, the method continues with a first special case determination step 1206. The first special case determination step 1206 determines if transmission mode is STTD and 2 or 4 pilot bits are used. If it is, no action is performed and the method continues with pre-derotation step 1006 in FIG. 10. Otherwise, the method continues with a second special case determination step 1208. The second special case determination step 1208 determines if transmission mode is FMB1 and 4 pilot bits are used. If it is, no action is performed and the method continues with pre-derotation step 1006 in FIG. 10. Otherwise, the method continues with a third special case determination step 1212. The third special case determination step 1212 determines if time instant is T1 or T3. If it is, no action is performed and the method continues with pre-derotation step 1006 in FIG. 10. Otherwise, symbols are buffered in a symbol buffering step 1218. Thereafter, the method continues with pre-derotation step 1006 in FIG. 10.

Figure 13:
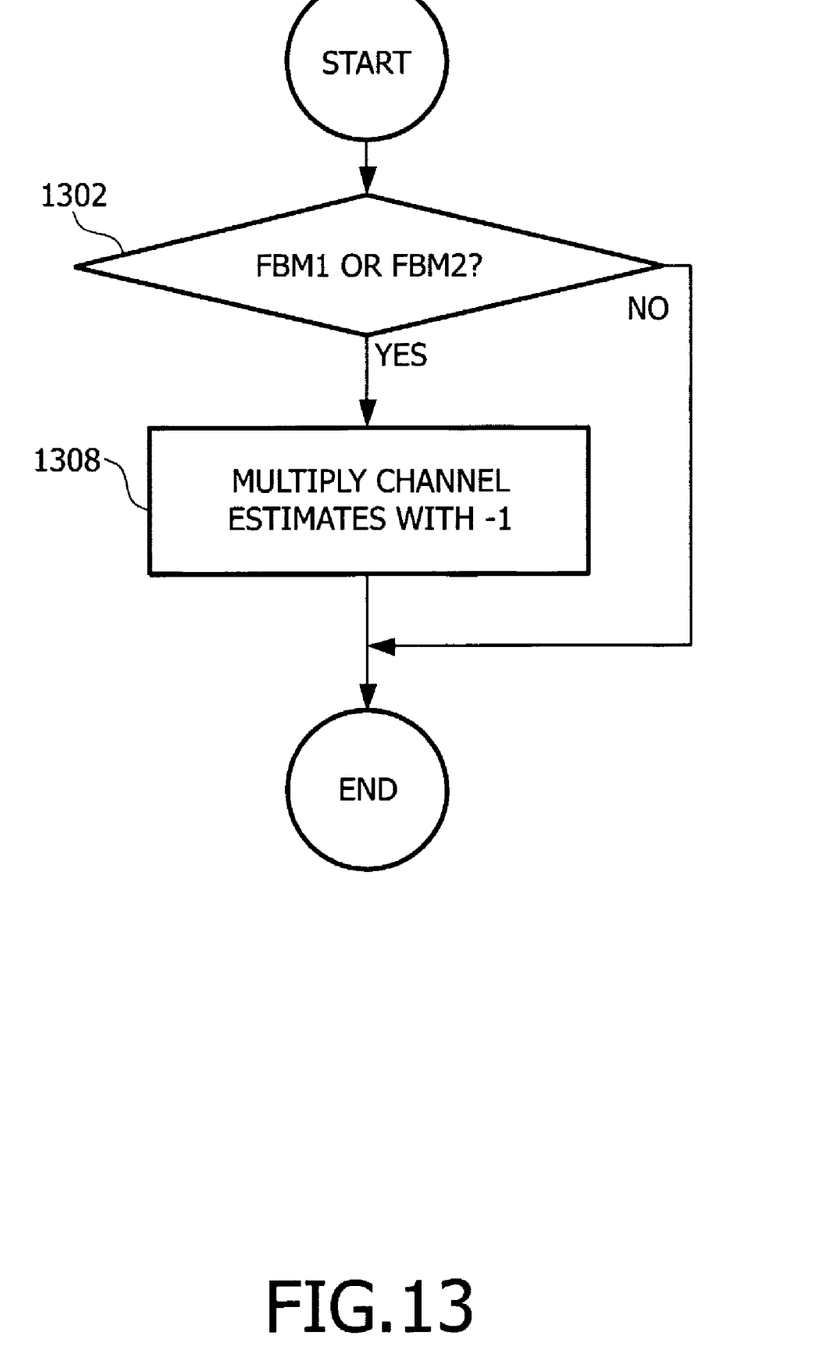
FIG. 13 shows a pre-derotation step.

FIG. 13 shows the pre-derotation step 1006 of FIG. 10. A transmission mode determination step 1302 determines if transmission mode is FMB1 or FMB2, i.e. closed loop transmission mode. If it is, a channel estimate weighting step 1308 is performed, where channel estimates for a first and a second transmit antenna are multiplied by a first and a second weight associated to the antenna, respectively. Thereafter, or if closed loop transmission mode is not determined in step 1302, the method ends.

Figure 14:
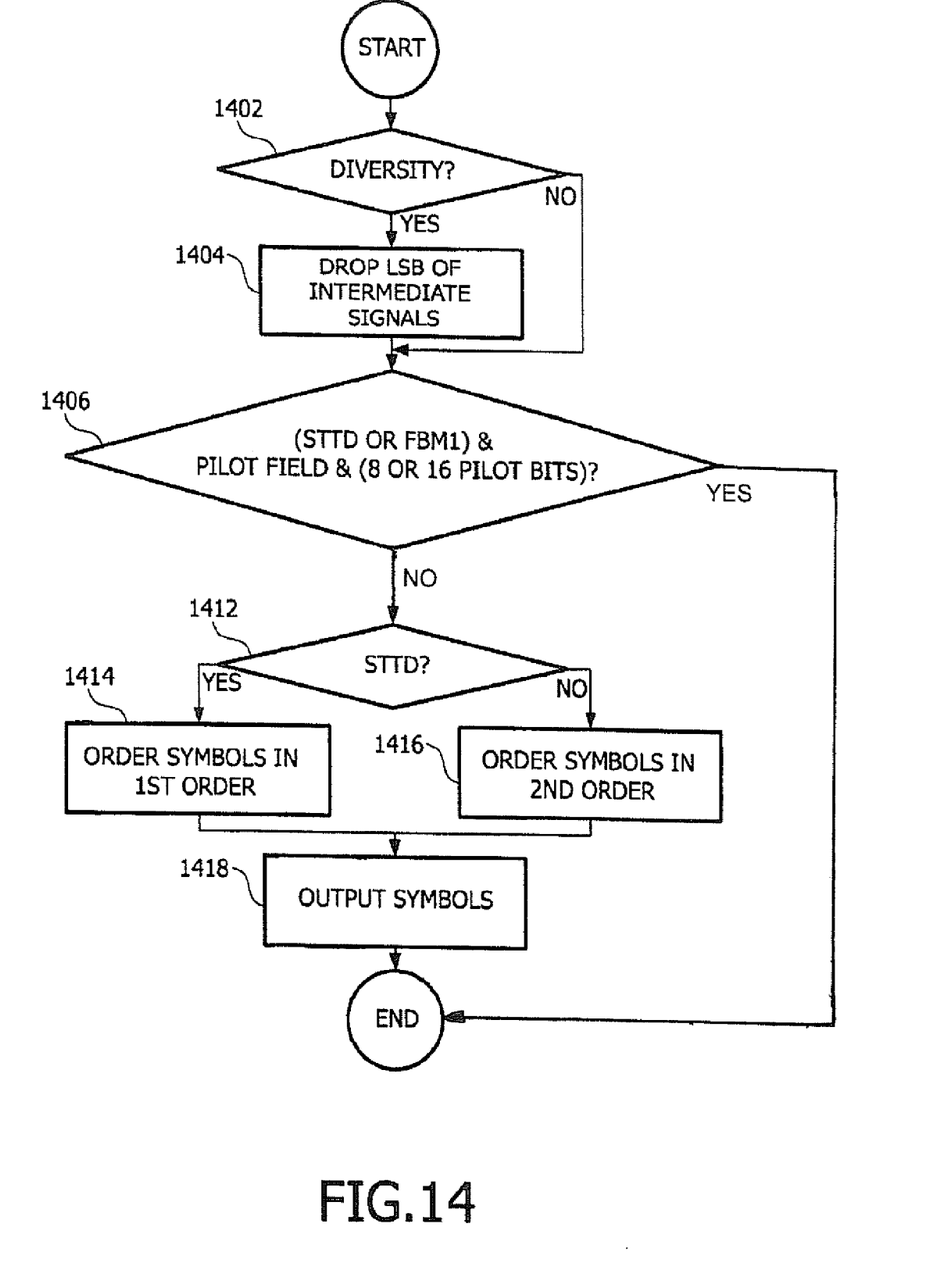
FIG. 14 shows a derotation step.

FIG. 14 shows the derotation step 1008 of FIG. 10. A diversity determination step 1402 determines if at least one finger of a rake receiver is operating in transmit diversity. If diversity is determined, a Least Significant Bit (LSB) dropping step 1404 is performed, where a one bit shift to the right of intermediate signals (signals 854, 856 in FIG. 8, signals 954, 958 in FIG. 9), i.e. LSB is dropped, to keep dynamic of the derotator output, i.e. on the same wordlength, for different transmission modes. Thereafter, or if no finger is operating in transmit diversity, the method continues with a special case determination step 1406. The special case determination step 1406 determines if transmission mode is STTD or FMB1, a pilot field is present, and 8 or 16 pilot bits are used. If these criteria are met, the method ends and the output derotated pilot symbol is provided. Otherwise, the method continues with a STTD determination step 1412. The STTD determination step 1412 determines if transmission mode is STTD. If it is, symbols are ordered in a first order in a first symbol ordering step 1414. Otherwise, symbols are ordered in a second order in a second ordering step 1416. This is due to the time switch of STTD symbols. After the first or the second ordering steps, respectively, the method continues with a symbol output step 1418. The symbol output step 1418 outputs derotated pilot symbols to e.g. Signal to Interference Ratio (SIR) estimation, and other derotated symbols to further processing and higher layers.

To conclude, the invention relates to a mobile communication apparatus comprising a receiver, a derotator, a demodulator and a processor. The receiver is connected to the derotator, the derotator to the demodulator, and the controller to the receiver, derotator and demodulator. The derotator comprises means for processing Primary Common Control Physical Channel during Space Time coding based Transmit Diversity transmission mode, pilot symbols, symbols during closed loop transmission modes, and means for outputting symbols to the demodulator in a temporal ordered sequence. The means are connected in series for enabling a universal derotator. A method for derotation is provided, comprising the steps of processing P-CCPCH during STTD transmission mode, processing pilot symbols, processing symbols during closed loop transmission modes, and outputting symbols in a temporal ordered sequence.

The invention claimed is:

1. A mobile communication apparatus comprising a receiver, a derotator, demodulator and a processor wherein said receiver is connected to said derotator, said derotator is connected to said demodulator, and said processor is connected to said receiver, said derotator, and said demodulator, wherein said derotator comprises:

a first means for processing a Primary Common Control Physical Channel (P-CCPCH) during a Space Time coding based Transmit Diversity (STTD) transmission mode;
a second means for processing symbols;
a third means for processing the symbols during closed loop transmission modes; and
a fourth means for outputting the symbols to said demodulator in an interleaved sequence,
wherein said first, said second, said third, and said fourth means are connected in series.

2. The mobile communication apparatus according to claim 1, wherein said first means is transparent to the symbols other than symbols related to the P-CCPCH during the STTD transmission mode.

3. The mobile communication apparatus according to claim 1, wherein said first means deletes a first symbol related to the P-CCPCH of every slot during the STTD transmission mode.

4. The mobile communication apparatus according to claim 1, wherein said second means is transparent to the symbols other than pilot symbols.

5. The mobile communication apparatus according to claim 1, wherein said third means is transparent during transmission modes other than closed loop transmission modes.

6. The mobile communication apparatus according to claims 1, wherein said derotator comprises a plurality of two-position switches.

7. A method for derotation of received symbols in a mobile communication apparatus, the method comprising the steps of:

processing a Primary Common Control Physical Channel (P-CCPCH) during a Space Time coding based Transmit Diversity (STTD) transmission mode;
processing symbols;
processing the symbols during closed loop transmission modes; and
outputting the symbols in an interleaved sequence.

8. The method according to claim 7, wherein said step of processing the P-CCPCH during the STTD transmission mode comprises:

deleting a first symbol related to the P-CCPCH of every slot during the STTD transmission mode.

9. The method according to claim 7, wherein said step of processing the symbols comprises processing a compressed mode by the steps of:

summing two pilot symbols; and
dividing the sum of said two pilot symbols by two.

10. The method according to claim 7, wherein said step of outputting the symbols comprises:

dividing the symbols by two when transmit diversity is present.

11. The method of claim 7, further comprising:
dumping the symbols when transmission of P-CCPCH with STDD is present.

12. The method of claim 7, further comprising:
determining whether two pilot bits or four pilot bits are used.

13. The method of claim 7, further comprising:
determining whether Feed Back Mode 1 (FBM1) or Feed Back Mode 2 (FBM2) is used.

14. The method of claim 7, further comprising:
dropping a Least Significant Bit (LSB) of intermediate signals when transmit diversity is present.

15. The method of claim 7, further comprising:
determining whether the transmission mode is STTD; and
ordering the symbols based upon the determining step.

16. A derotator comprising:
a Primary Common Control Physical Channel (P-CCPCH) processor block that receives despread symbols and processes the despread symbols;
a first derotator block that receives the processed symbols from the P-CCPCH processor block, wherein the first derotator block further comprises:
a pilot derotator sub-block that operates only on pilot symbols within the processed symbols from the P-CCPCH processor block and produces a first signal wherein non-pilot symbols are unaltered,
a general derotator sub-block that receives the first signal from the pilot derotator sub-block, applies different weights to the processed symbols from the P-CCPCH processor block based upon whether a transmission mode is closed loop, and produces a second signal; and
a second derotator block that receives the second signal from the general derotator sub-block, performs switching operations based upon whether the transmission mode is Space Time coding based Transmit Diversity (STTD), and produces an output signal.

17. The derotator of claim 16, wherein the P-CCPCH processor block further comprises:
a first P-CCPCH processor switch that selectively forwards the despread symbols based upon whether the transmission mode is STTD;
a second P-CCPCH processor switch that sends every despread symbol that is a multiple of ten to a first dump.

18. The derotator of claim 16, wherein the pilot derotator sub-block further comprises:
a first switch that selectively forwards the processed symbols based upon whether there is a compressed mode;
a compressed mode path comprising
a summer that adds two pilot symbols from the processed symbols to produce a sum when there is a compressed mode, and
a bit shifter that divides the sum of the two pilot symbols by two;
a second switch that selectively forwards the pilot symbols based upon whether the transmission mode is STTD; and
a third switch that selectively outputs the pilot symbols as the first signal when a time instant is T1 or T3.

19. The derotator of claim 16, wherein the general derotator sub-block further comprises:
a plurality of switches that selectively forward the first signal based upon whether the transmission mode is STTD; and
a plurality of multipliers that apply weights to the first signal based upon the transmission mode and produce the second signal.

20. The derotator of claim 16, wherein the second derotator block further comprises:
a plurality of switches that selectively forward the second signal based upon the transmission mode and whether a pilot field is present in the second signal; and
a switch that sends the second signal to a second dump when transmission of P-CCPCH with STDD is present.

* * * * *